US 7,652,759 B1

(12) United States Patent
Dogul et al.

(10) Patent No.: US 7,652,759 B1
(45) Date of Patent: Jan. 26, 2010

(54) INDUSTRIAL DEVICE WITH ADAPTIVE OPTICS

(75) Inventors: James E. Dogul, Hudson, NH (US); Richard Galera, Nashua, NH (US); George E. Rollins, Chelmsford, MA (US); Derek W. Jones, Kirkcudbright (GB); George K. Schuster, Royal Oak, MI (US); Suresh R. Nair, Amherst, NH (US); Ray C. Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 388 days.

(21) Appl. No.: 11/360,174

(22) Filed: Feb. 23, 2006

(51) Int. Cl.
*G01N 21/41* (2006.01)

(52) U.S. Cl. .......................... 356/218; 356/72; 356/445

(58) Field of Classification Search .................. 356/218, 356/445–448, 72–73; 250/339.05, 339.07, 250/341.1, 341.2, 458.1; 353/85, 121, 122; 351/159; 385/12, 15
See application file for complete search history.

(56) References Cited

U.S. PATENT DOCUMENTS

| | | | | |
|---|---|---|---|---|
| 4,856,863 A | * | 8/1989 | Sampsell et al. | 385/4 |
| 4,949,972 A | * | 8/1990 | Goodwin et al. | 273/371 |
| 5,461,227 A | * | 10/1995 | Blau | 250/221 |
| 5,880,954 A | * | 3/1999 | Thomson et al. | 700/79 |
| 5,923,036 A | * | 7/1999 | Tague et al. | 250/339.07 |
| 5,966,230 A | * | 10/1999 | Swartz et al. | 359/196 |
| 5,988,645 A | * | 11/1999 | Downing | 273/348 |
| 6,060,224 A | * | 5/2000 | Sweatt et al. | 430/395 |
| 6,124,586 A | * | 9/2000 | De Coi | 250/221 |
| 6,239,423 B1 | * | 5/2001 | Hama et al. | 250/221 |
| 6,687,036 B2 | | 2/2004 | Riza | |
| 6,744,365 B2 | | 6/2004 | Sicuranza | |
| 6,783,167 B2 | | 8/2004 | Bingle et al. | |
| 6,784,415 B2 | * | 8/2004 | Kudo et al. | 250/221 |
| 6,788,416 B2 | * | 9/2004 | Reuter | 356/445 |
| 6,889,903 B1 | | 5/2005 | Koenck | |
| 6,958,683 B2 | | 10/2005 | Mills et al. | |
| 6,979,814 B2 | * | 12/2005 | Kudo et al. | 250/221 |
| 6,989,922 B2 | | 1/2006 | Phillips et al. | |
| 7,154,660 B2 | * | 12/2006 | Reuter | 359/291 |
| 7,343,062 B1 | * | 3/2008 | Dogul et al. | 385/15 |
| 7,345,806 B2 | * | 3/2008 | Simonian et al. | 359/291 |
| 7,370,979 B2 | * | 5/2008 | Whitehead et al. | 353/85 |
| 7,508,512 B1 | * | 3/2009 | Rollins et al. | 356/399 |
| 2003/0053026 A1 | | 3/2003 | Roorda | |
| 2003/0215172 A1 | * | 11/2003 | Koenig | 385/15 |
| 2004/0114381 A1 | | 6/2004 | Salmeen et al. | |
| 2005/0001573 A1 | | 1/2005 | Miller et al. | |
| 2005/0105044 A1 | * | 5/2005 | Warden et al. | 351/159 |
| 2005/0156481 A1 | * | 7/2005 | Zhou et al. | 310/309 |
| 2005/0162762 A1 | | 7/2005 | Novak | |

* cited by examiner

*Primary Examiner*—Sang Nguyen
(74) *Attorney, Agent, or Firm*—Turocy & Watson LLP; William R. Walbrun

(57) ABSTRACT

An industrial device comprises a light emitter and a detector that is optically coupled to the emitter. A first deformable mirror/lens is optically coupled to the emitter, the first deformable mirror/lens is dynamically shaped to facilitate receipt of light at the detector. For example, the deformable mirror/lens can be associated with one or more actuators that causes the mirror/lens to be shaped in a desirable manner.

27 Claims, 10 Drawing Sheets

INDUSTRIAL DEVICE WITH ADAPTIVE OPTICS

TECHNICAL FIELD

The subject invention relates generally to industrial devices, and, more particularly, to utilization of adaptive optics in connection with industrial devices.

BACKGROUND

Industrial processes are employed in connection with producing numerous products that are utilized every day by consumers. For instance, everything from textiles to toothbrushes to automobiles to complex electronic devices is produced in industrial environments. To effectuate production of such items, complex and oftentimes dangerous equipment must be employed. For example, to create an automobile door, sheet metal must be cut in a desired shape by large cutting devices. Without adequate safety mechanisms, one or more individuals may become seriously injured and/or disfigured by accidentally placing a body part in an improper place at an inopportune time. Thus, many industrial devices are associated with safety mechanisms that cause such devices to automatically shut down when an individual or object is detected in an improper position.

One example of a safety device that is commonly employed in industrial environments is a safety light curtain. Safety light curtains are utilized to ensure that objects of threshold sizes do not come within a certain distance of particular portions of machinery. More specifically, a plurality of light emitters are aligned with a plurality of light detectors such that multiple beams of light are emitted in parallel to one another by the emitters and received by respective detectors. The detectors can be coupled to a device that is employed in connection with analyzing the light signals (the beams of light). In a detailed example, the detectors can be sequentially enabled by a shift register, and the received light signal can be analyzed in sequence by a microprocessor, which determines status of each light beam (e.g., whether a certain light beam is impeded).

If, upon analyzing the received signal, a determination is made that one or more beams of light has been impeded (such that light emitted from an emitter does not reach a corresponding detector), a microcontroller can communicate with output devices that are coupled to a controlling element to shut down a machine associated with the safety light curtain. Thereafter the machine can be manually restarted upon the beams being unimpeded. As can be surmised from the above, safety light curtains have saved numerous individuals from serious injury as well as increased useful life of machines (by protecting such machines from foreign objects in sensitive areas).

Yet another safety mechanism that is employed in industrial settings is a single beam safety device, where a light emitter directs a beam of light towards a detector. If an obstruction is placed between the emitter and the detector (thus impeding the beam of light), light will not be received at the detector. Control circuitry associated with the detector will cause a machine related to the single beam safety device to cease hazardous operation, cause an alarm to be initiated, and/or the like. While safety light curtains can be quite large, heavy, and stable, single beam safety devices are typically lightweight and portable. A substantial amount of vibration, dust, and the like can be associated with many industrial environments, which can cause degradation in optical signals received at the detector. For example, initially, an emitter and detector can be optimally aligned, thereby enabling the detector to receive and analyze a strong, high quality optical signal. Over time, however, due to vibration the emitter and detector may slowly become misaligned, causing a reduction in signal strength received at the detector. After a certain amount of misalignment has occurred, the emitter and detector must be re-aligned to enable use of the single beam safety device.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

To aid in mitigating the effects of vibration with respect to industrial devices such as industrial safety devices, adaptive optics can be employed. For example, several industrial safety devices utilize light beams in connection with maintaining safety with respect to a machine or portion thereof. Such devices include single beam safety devices, safety light curtains, as well as other devices. A light emitter, such as a light emitting diode, outputs light energy, which can be collimated by means of optical elements and travel through space to a detector. In industrial environments, however, vibration can cause the emitter and the detector to become at least partially misaligned, thereby reducing strength/quality of an optical signal received at the detector. Adaptive optics, which include deformable mirrors/lenses, can be associated with the optical elements coupled to the emitter and/or the detector. An optical signal received at the detector can be analyzed and the deformable mirrors/lenses can be dynamically shaped to enhance signal strength/quality received at the detector based at least in part upon the analysis. For example, a deformable mirror/lens can be physically proximate to the emitter and optically coupled thereto, such that light emitted from the emitter travels through the deformable mirror/lens. If the emitter and detector have become somewhat misaligned, the deformable mirror/lens can be dynamically shaped to re-direct the light to the detector (as if there were no misalignment).

Numerous deformable mirrors/lenses can be associated with an emitter and/or detector to enhance optical signal strength/quality. Furthermore, to effectuate dynamic shaping of a deformable mirror/lens, one or more actuators can be physically coupled thereto. Particular amounts of electrical voltage/current can be provided to each actuator that is coupled to a deformable mirror/lens to shape such mirror/lens in a desired manner. Optical signal analysis circuitry can review optical signals received by the detector and can determine a desired shape of the deformable mirror/lens, and can instruct a power supply as to an amount of power to deliver to one or more actuators to effectuate such shaping.

Moreover, adaptive optics can be associated with a light emitter and a detector in connection with initially aligning the emitter and the detector. For example, one or more deformable mirrors/lenses can be associated with the emitter and/or the detector, and can initially be shaped in any desirable manner (e.g., a neutral position). Light can be emitted by the emitter towards the detector after such devices have been initially aligned, and an analysis of the optical signal can be undertaken. Thereafter, the one or more deformable mirrors/lenses can be shaped in order to determine if the emitter and detector can be more precisely aligned. For instance, if the deformable mirrors/lenses are altered and an enhanced optical signal is received, it can be determined that the light emitter and the detector can be more precisely aligned. In one particular example, the deformable mirrors can be shaped several times to aid in determining a direction and amount of displacement with respect to which the emitter and/or the detector should be translated (as well as a desired magnitude of light).

The adaptive optics systems described herein can be employed in a variety of contexts. For example, as described above, adaptive optics can be utilized in connection with a single beam safety device, a safety light curtain, or any other suitable safety device that employs an emitter and a detector. Furthermore, adaptive optics can be employed within scanning devices such as barcode scanners to enhance an optical signal. In particular, deformable mirrors/lenses can be employed in connection with a light emitter that directs light to a reflective or semi-reflective surface. The light reflected from such surface can then be received by a detector, which may also be associated with adaptive optics (e.g., deformable mirrors/lenses). Thus, for instance, barcode scanners can be made more reliable, efficient, and accurate through employment of adaptive optics therein.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
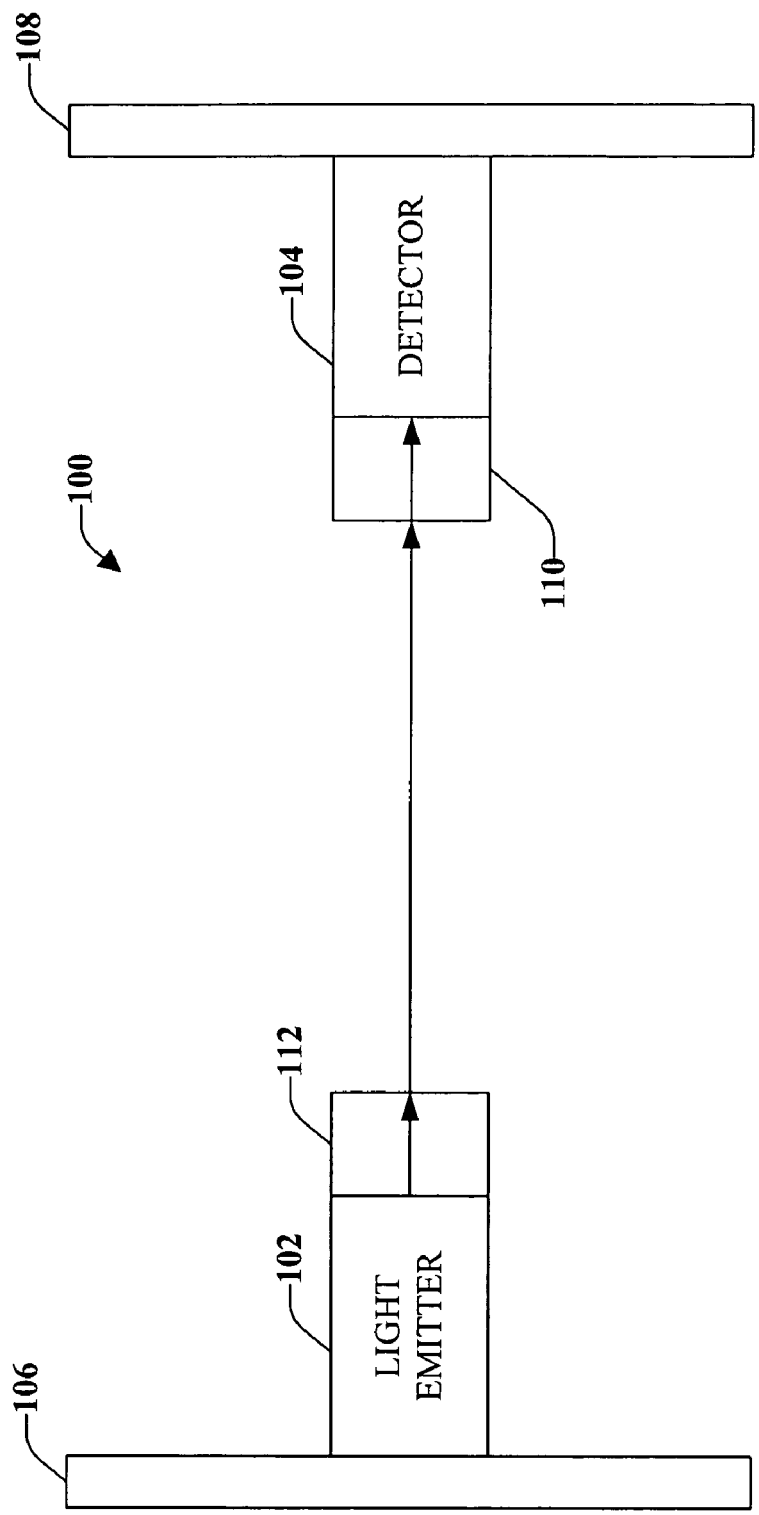
FIG. 1 illustrates a high level block diagram of an industrial device that includes adaptive optics elements.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a device 100 that can be utilized within an industrial environment, wherein an optical signal is of importance. For example, the device 100 can be designed as a safety system, such as a single beam safety device, utilized within a safety light curtain, utilized within a barcode scanner, etc. The device 100 includes a light emitter 102 that is optically aligned with a detector 104. For example, the light emitter 102 and/or the detector 104 can be removably attached to one or more structures 106 and 108. For example, the device 100 can be employed as a safety device, and the light emitter 102 and the detector 108 can be positioned on the structures 106 and 108 to align the emitter 102 and the detector 104 in association with a machine (not shown).

In conventional safety devices, over time the emitter 102 and the detector 104 can become misaligned due to, for example, vibration that is common in industrial environments. In more detail, large machinery with rapidly moving parts can cause a significant amount of vibration, thereby altering position of the light emitter 102 and/or the detector 104 and misaligning such devices. To increase time between required realignment of the light emitter 102 and the detector 104, one or more deformable mirrors/lenses 110 can be optically coupled to the detector 104. Similarly, one or more deformable mirrors/lenses 112 can be optically coupled to the light emitter 102. A power supply (not shown) can provide voltage and/or current to the deformable mirrors/lenses 110 and/or 112, thereby causing such deformable mirrors/lenses 110 and 112 to alter shape to enhance an optical signal received at the detector 104. For example, the deformable mirrors can be micromachined membrane deformable mirrors, piezoelectric deformable mirrors, continuous membrane deformable mirrors, and/or any other suitable deformable mirrors. Furthermore, the deformable lenses can be liquid, magnetic fluidic, liquid crystal, and/or any other suitable deformable lenses.

While the device 100 is illustrated as including deformable mirror(s)/lens(es) at both the light emitter 102 and the detector 104, it is understood and appreciated that the device 100 can be modified such that only the detector 104 is associated with deformable mirror(s)/lens(es) or only the light emitter 102 is associated with deformable mirror(s)/lens(es). One skilled in the art will understand and appreciate that various embodiments and implementations are possible with respect to the light emitter 102, the detector 104, and deformable mirrors/lenses, all of which are contemplated by the inventors and intended to fall under the scope of the hereto-appended claims. In one example, the light emitter 102 can emit light by way of the deformable mirror/lens 112, which directs light towards the detector 104. The deformable mirror/lens 110 can receive such light and be configured to provide the light to the detector 104. An analysis component (not shown) can analyze an optical signal received at the detector 104 and cause the deformable mirror(s)/lens(es) 110 and 112 to be shaped in such a manner as to enhance the optical signal. Therefore, for example, if vibrations cause the light emitter 102 and the detector 104 to become misaligned, the deformable mirror(s)/lens(es) 110 and/or 112 can be dynamically shaped to ensure receipt of an optical signal of sufficient quality/strength. Accordingly, the usable life of the device 100 is lengthened, as an amount of time between realignment of the light emitter 102 and the detector 104 will be greater than that for conventional systems.

Similarly, dust or other semi-transparent material can be resident within an industrial environment, and can cause degradation of an optical signal received at the detector 104. Thus, if the device 100 is employed in connection with a safety device and there is sufficient optical signal degradation, the device 100 may output an alarm or error needlessly if not for the deformable mirrors/lenses 110 and 112. However, such mirrors/lenses 110 and 112 can be dynamically shaped to enhance the optical signal received at the detector 104, thereby reducing a number of false warnings and/or machine stoppages caused by lack of a sufficient optical signal. If the device 100 is employed in connection with a safety device and the light provided by the emitter 102 is obstructed prior to reaching the detector 104, operation of a machine can be altered to avoid injury of an individual, harm to a machine or product, etc. For instance, the device 100 can be employed as a single beam safety device, within a light curtain, or within any other suitable safety system.

Furthermore, the deformable mirrors/lenses 110 and/or 112 can be employed in connection with filtering light received at the detector 104. In more detail, the emitter 102 can be configured to emit light of a particular wavelength; thus, it may be desirable to configure the detector 104 to receive light at such wavelength while ignoring light of disparate wavelengths. The deformable mirrors/lenses 110 and/or 112 can be shaped in such a manner as to act as a filter with respect to light associated with particular wavelengths.

Figure 2:
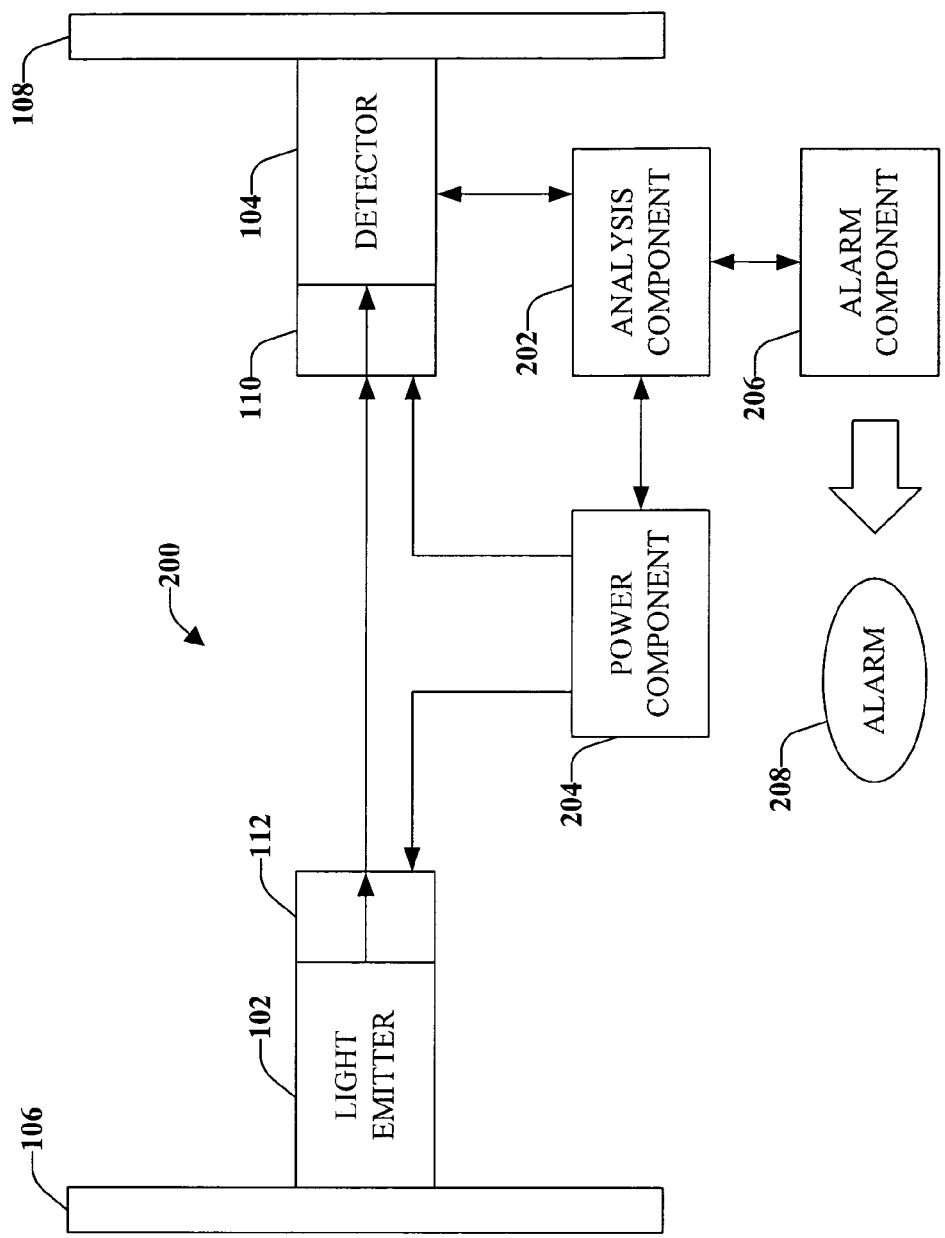
FIG. 2 illustrates an industrial device, wherein power is provided to one or more actuators associated with deformable mirrors/lenses to enhance an optical signal.

Turning now to FIG. 2, an industrial safety system 200 is illustrated. The system 200 includes the light emitter 102 that is configured to provide light to the detector 104. As described above, the light emitter 102 and the detector 104 are mounted on structures 106 and 108 to aid in reducing effects of vibration on the system 200, slippage with respect to the light emitter 102 and the detector 104, etc. The light emitter 102 and/or the detector 104 can be optically coupled to the deformable mirrors/lenses 112 and 110, respectively. Pursuant to an example, the light emitter 102 (which can be a light emitting diode (LED) or any other suitable light emitting device) can be approximately aligned with the detector 104, such that light emitted by the emitter 102 is received at the detector 104. The light can be relayed to the detector 104 by way of the one or more deformable mirrors/lenses 112 and 110.

An analysis component 202 can analyze an optical signal received at the detector 104 and determine a manner in which to shape the deformable mirrors/lenses 112 and/or 110 to enhance the optical signal. For example, if the light emitter 102 and the detector 104 have become somewhat misaligned, the analysis component 202 can determine that such misalignment has occurred by analyzing the optical signal received at the detector 104. The analysis component 202 can be communicatively coupled to a power component 204 and can provide instructions to the power component 204 relating to shaping the deformable mirrors/lenses 110 and 112. In more detail, shape of the deformable mirrors/lenses 110 and 112 can be altered by providing certain voltages/currents to disparate portions of the deformable mirrors/lenses 110 and 112 and/or actuators associated therewith. For instance, the deformable mirrors/lenses 110 and 112 can be associated with several actuators that, when provided with certain voltages/currents, change the shape of the deform able mirrors/lenses 110 and 112. Continuing with the above example, the power component 204 (at the direction of the analysis component 202) can provide certain amounts of voltage/current to appropriate actuators to essentially re-align the light emitter 102 and the detector 104 automatically without user intervention.

There may come a point in time, however, that the light emitter 102 and the detector 104 become misaligned to a point that realignment of such devices is needed to continue effective use of the system 200. For example, the deformable mirrors/lenses 110 and 112 may fail and/or may not be able to further enhance an optical signal. The analysis component 202 can determine that quality of an optical signal received at the detector 104 has fallen below a threshold due to misalignment, and can determine that the deformable mirrors/lenses 110 and 112 are not capable of further enhancing the optical signal. The analysis component 202 can instruct an alarm component 206 to generate an alarm 208 to inform maintenance personnel or an operator of a machine of a need to physically realign the light emitter 102 and the detector 104. The alarm 208 can be visual and/or audible in nature, such as flashing lights, sirens, etc. Moreover, the alarm component 206 can be configured to automatically generate emails, text messages, and the like to inform appropriate personnel of problems with the system 200. In a particular example, the alarm component 206 can generate an email or text message that includes reasons for generation of the alarm 208, time of the alarm, and any other suitable data that may be of use with respect to maintaining the system 200.

Figure 3:
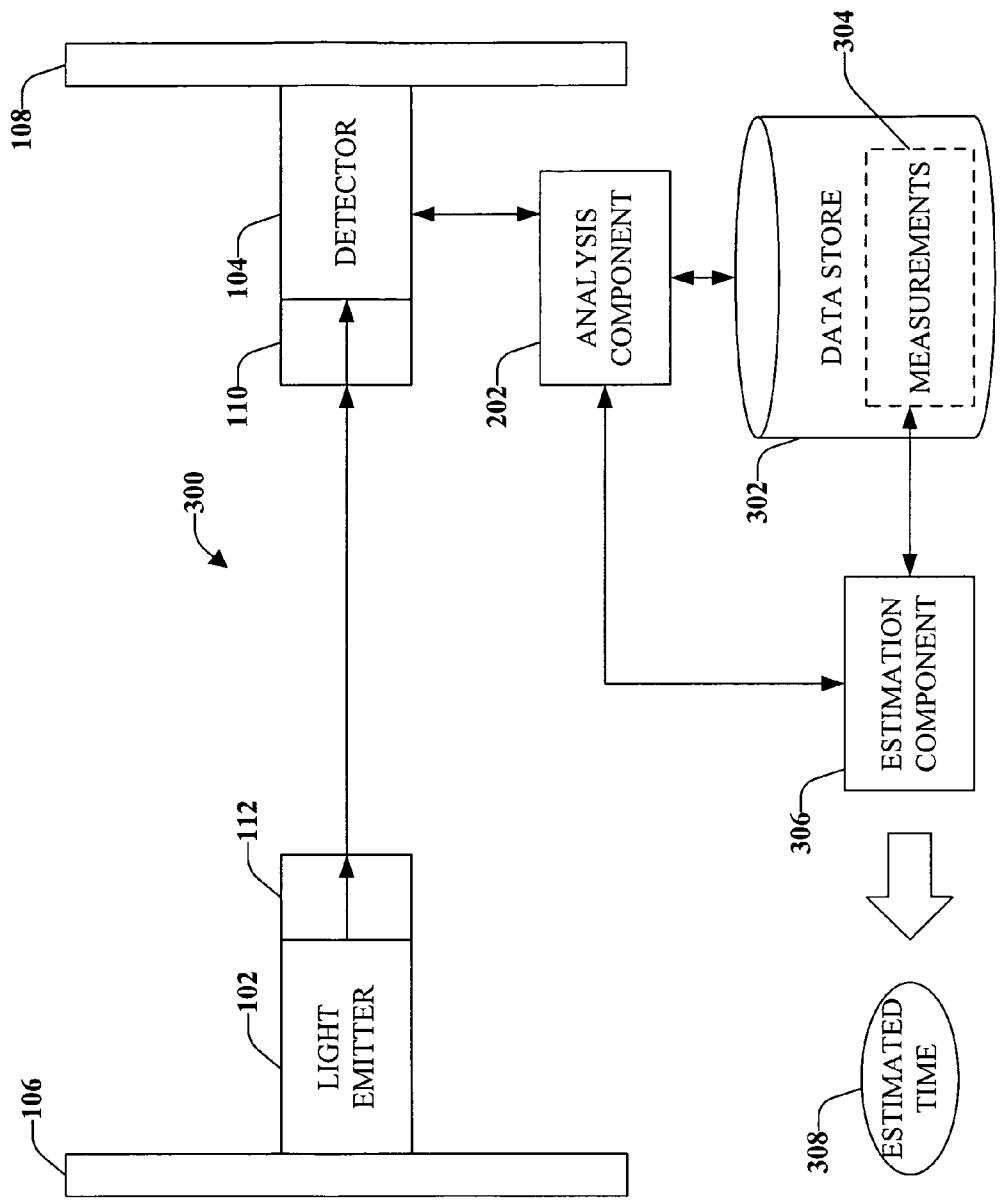
FIG. 3 illustrates an industrial device that can estimate an amount of time until an emitter and a detector become misaligned.

Referring now to FIG. 3, an adaptive optics system 300 that can be employed within industrial environments is illustrated. The system 300 includes the light emitter 102 and the detector 104, wherein such devices are aligned such that the detector 104 receives light emitted by the emitter 102. As before, the light emitter 102 and the detector 104 can be removably mounted to structures 106 and 108, which can be of any suitable shape and made of any suitable material. The deformable mirror/lens 110 and/or 112 (adaptive optic elements) can be coupled to the light emitter 102 and/or the detector 104 to automatically align such emitter 102 and detector 104 given partial misalignment caused by vibration. As described above, the deformable mirror/lens 110 can include a plurality of deformable mirrors, multiple actuators coupled to each of such mirrors/lenses, etc.

The system 300 additionally includes the analysis component 202 that is communicatively coupled to the detector 104, wherein the analysis component 202 can obtain and interpret optical signals received at the detector 104. For example, the analysis component 202 can be associated with a data store 302, and measurements 304 relating to optical signals can be stored therein. Additionally or alternatively, the analysis component 202 can analyze optical signals and convert them into any suitable measurements, such as amount of misalignment, percent difference between strength/quality of a received optical and an optimal optical signal, or any other suitable measurements. An estimation component 306 can access the measurements 304 from the data store (in any desired format) and, upon analyzing such measurements, can output an estimated time 308 until realignment of the emitter 102 and the detector 104 will be required. Additionally, the estimation component 306 can be communicatively coupled to the analysis component 202, wherein the analysis component 202 can provide the estimation component 306 with most recent measurements and/or conversions of measurements 304 within the data store 302. The estimation component 306 can then analyze such data and infer the estimated time 308.

As used herein, the terms "infer", "inference", or the like refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention. Thus, in one example, based at least in part upon user context (e.g., geographic location of a user, applications running on a computer, . . . ), an association between extracted data and associated text may be made. In a detailed example, the data store 302 can include several measurements relating to optical signals received/determined by the analysis component 202 over a particular amount of time. The estimation component 306 can review such measurements and infer that at approximately X amount of time in the future the light emitter 102 and the detector 104 will become misaligned to an extent that the deformable mirrors/lenses 110 and 112 will be unable to sufficiently correct such misalignment. The inference can be based upon historical data, trends located in data, and the like. In this manner, a method of maintenance scheduling can be implemented.

Figure 4:
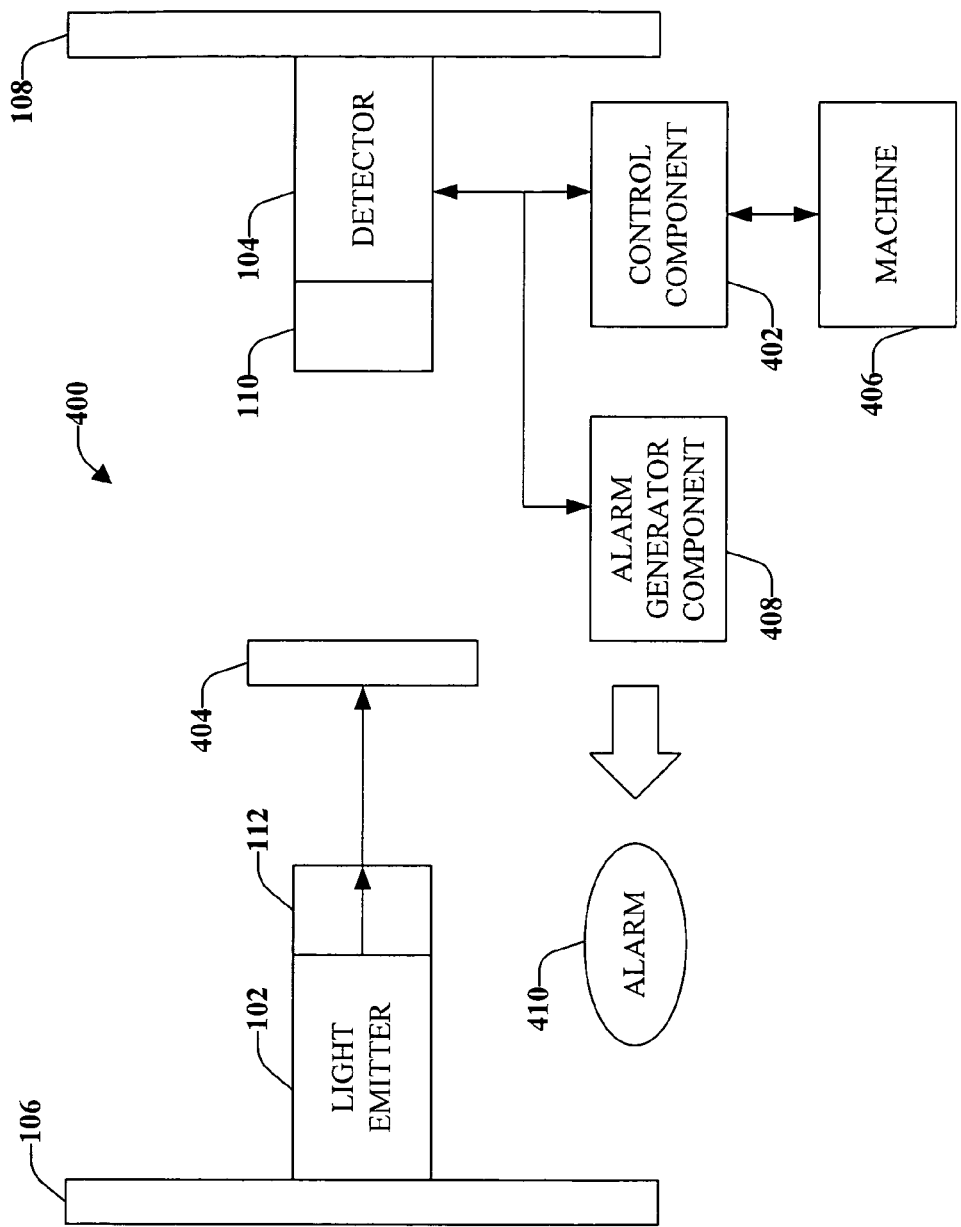
FIG. 4 illustrates an industrial safety device that employs adaptive optics.

Turning now to FIG. 4, an industrial safety system 400 that utilizes adaptive optics is illustrated. The system 400 includes the light emitter 102, the detector 104, the structures 106 and 108, and the deformable mirrors/lenses (adaptive optics) 110 and 112, which can act as described above. In more detail, the light emitter 102 and the detector 104 can be aligned with one another to enable a beam of light to travel through space between the light emitter 102 and the detector 104. The deformable mirrors/lenses 110 and/or 112 can be employed to at least partially correct misalignment between the light emitter 102 and the detector 104 by being dynamically shaped to enhance an optical signal received at the detector 104. A control component 402 is communicatively coupled to the detector 104 and analyzes optical signals received at the detector 104. If, for example, an obstruction 404 is existent between the emitter 102 and the detector 104, thus preventing the beam of light from reaching the detector 104, the control component 402 can detect the lack of an optical signal. The control component 402 can then act according to a prescribed policy with respect to a machine 406. For example, if it is detected that the obstruction 404 exists between the light emitter 102 and the detector 104, the control component 402 can include circuitry/software that causes the hazardous motion of the machine 406 to be shut down (to avoid injury to a person, machinery, and/or product). Additionally, the detector 104 can be associated with an alarm generator component 408 that can be employed to generate an alarm 410. As with the alarm component 206 (FIG. 2), the alarm 410 output by the alarm generator component 408 can be any suitable alarm that notifies an operator, maintenance personnel, or the like of the obstruction 404.

Figure 5:
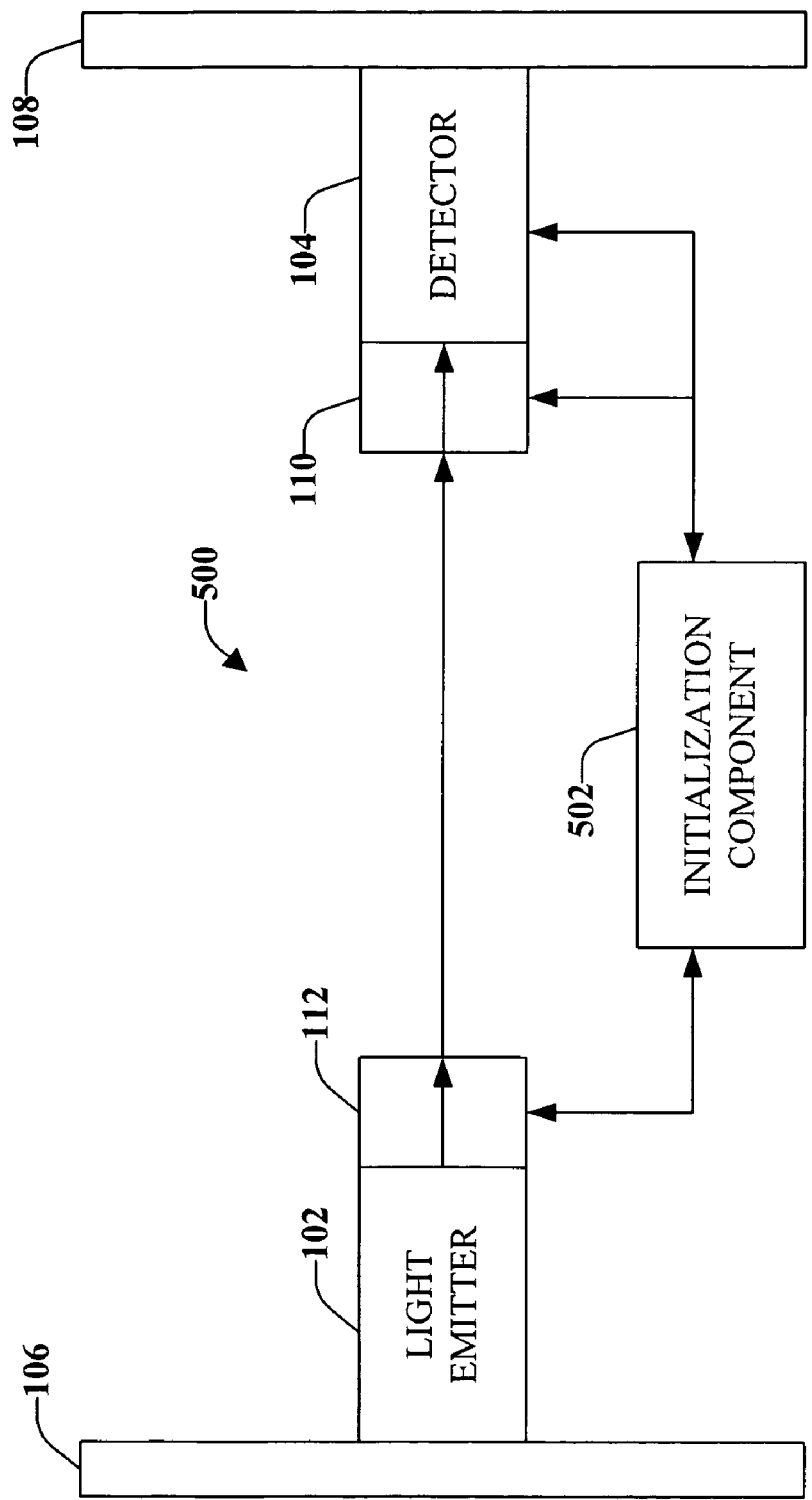
FIG. 5 illustrates an initial emitter/detector alignment system that operates with aid of adaptive optics.

Now turning to FIG. 5, a system 500 that facilitates initially aligning the emitter 102 and the detector 104 is illustrated. The system 500 includes the emitter 102 and the detector 104, wherein the light emitter 102 is configured to provide light towards the detector 104. The light emitter 102 and the detector 104 are associated with the structures 106 and 108, wherein the emitter 102 and the detector 104 can be translated in any direction on a planar surface of the structures 106 and 108, thereby enabling proper alignment of the light emitter 102 and the detector 104. An initialization component 502 receives optical signals from the detector 104 (resulting from light received from the emitter 102) and analyzes such signals to determine strength/quality of the received signal. The initialization component 502 can dynamically shape the deformable mirrors/lenses 112 and/or 110 to alter strength/quality of the optical signal received at the detector 104. The initialization component 502 can then analyze such signal to determine whether a position of the light emitter 102 and/or the detector 104 should be altered to better align such devices. The analysis undertaken by the initialization component 502 can result in instructions relating to direction that the light emitter 102 and/or the detector 104 should be translated and an amount of translation (e.g., 5 millimeters) in such direction that will result in a high quality optical signal.

As will be discerned by one skilled in the art, the initialization component 502 can utilize a heuristic approach by shaping the deformable mirrors/lenses 110 and/or 112 in a variety of manners to assist in aligning the light emitter 102 and the detector 104 properly. Furthermore, the initialization component 502 can be associated with actuators (not shown) that can be employed to cause such movement (rather than asking an individual to manually reposition the light emitter 102 and/or the detector 104). Furthermore, the initialization component 502 can employ an algorithm that enables grossly misaligned emitters and detectors to locate one another. For instance, the initialization component 502 can cause the emitter 102 and the detector 104 to begin at a "neutral" position and thereafter alter shape of the deformable mirrors associated therewith to enable to emitter 102 and the detector 104 to locate one another. In summary, the system 500 can utilize adaptive optics to aid in initially aligning a light emitter and a detector within an industrial safety system, scanning device, or the like.

Figure 6:
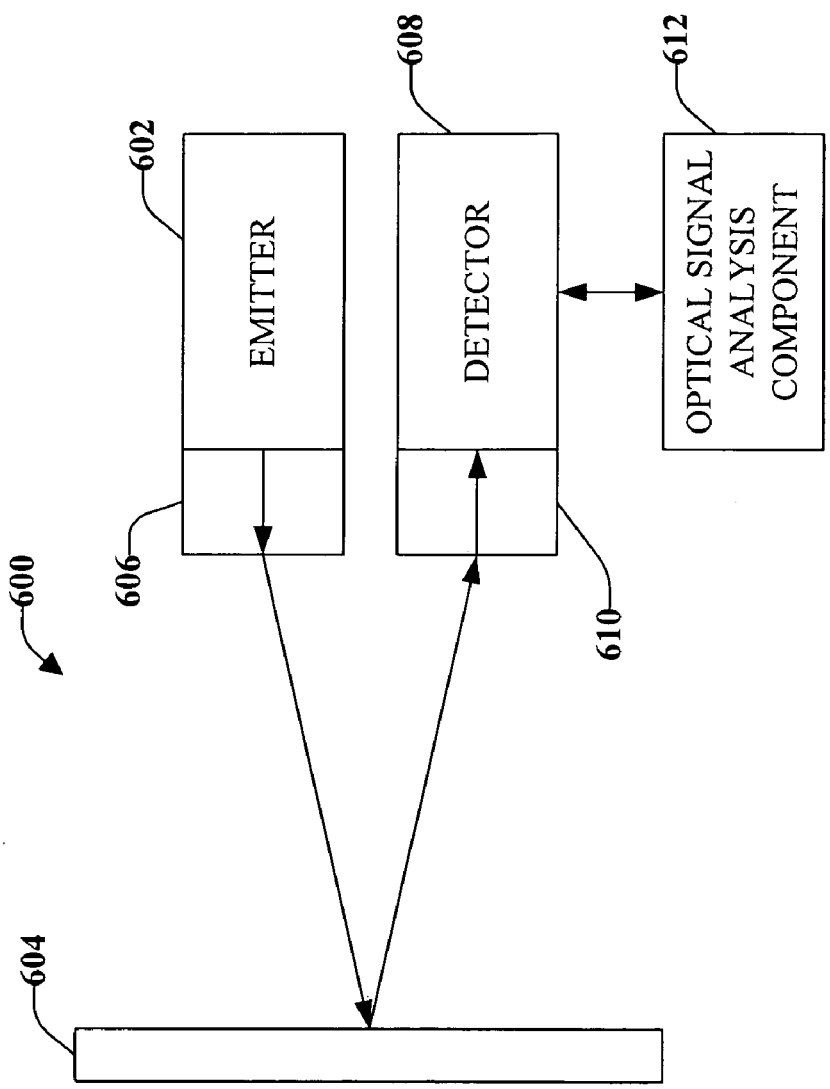
FIG. 6 illustrates a scanning system, such as a barcode scanner, where adaptive optics are employed therein.

Now referring to FIG. 6, an optical scanning system 600, such as a barcode scanning system 600 that utilizes adaptive optics, is illustrated. The system 600 includes an emitter 602 that emits light towards a reflective or semi-reflective entity 604. The emitter 602 may be associated with adaptive optic device(s) 606, which can include one or more deformable mirrors, lenses, and actuators associated therewith. For example, the emitter 602 can direct light towards a particular portion of the entity 604 by way of the adaptive optic device(s) 606. Light can then be reflected towards a detector 608 which is configured to receive light emitted from the emitter 602. The detector 608, like the emitter 602, can be optically coupled to adaptive optic devices 610, which can be dynamically shaped to enhance an optical signal reflected from the entity 604. Thus, the system 600 enables more accurate reading of barcodes or other entities and is resistant to misalignment of the emitter 602 and the detector 608.

The detector 608 can be associated with an optical signal analysis component 612 that analyzes light received by the detector 608 to determine information resident within a scanned barcode. For instance, barcodes can include information or links to information relating to pricing, inventory, and other data associated with a product. Additionally, an interface (not shown) can be provided to inform a user that a barcode has been properly read or to indicate that the barcode has not properly been read. For example, a red or green light may indicate to a user whether a barcode has been effectively read. Likewise, a graphical user interface with detailed graphics can indicate whether the barcode has been read together with information relating to an item associated with the barcode. Moreover, while not displayed, the emitter 602 and detector 608 can be within a same housing and physically coupled to a same rigid structure to aid in maintaining sufficient alignment between the emitter and the detector 608. In another example, the emitter and detector 608 can be housed separately and/or can be fixed to disparate structures within a barcode scanner.

Figure 7:
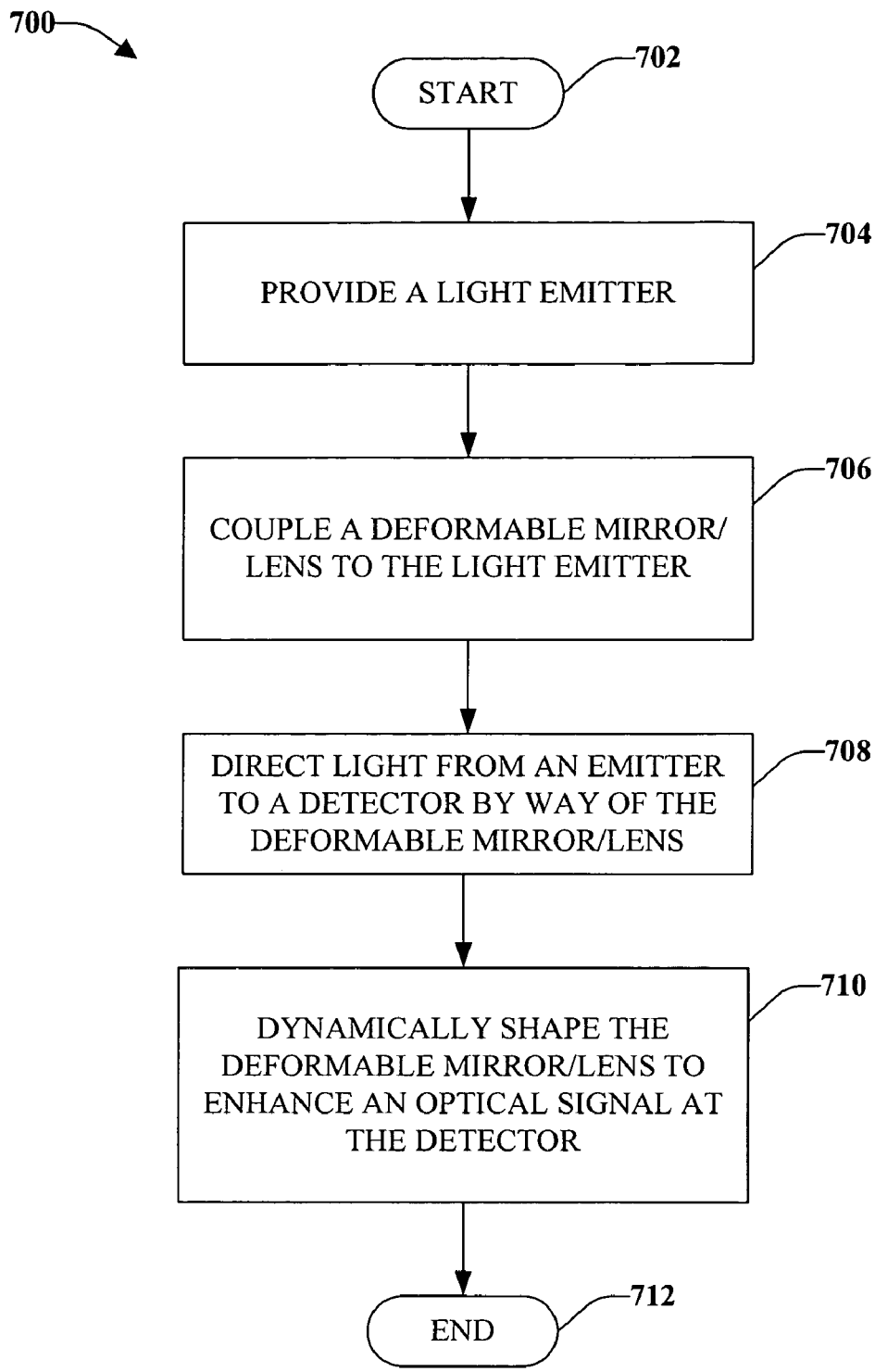
FIG. 7 is a representative flow diagram of a methodology for dynamically shaping deformable mirrors/lenses to enhance an optical signal at a detector.
Figure 8:
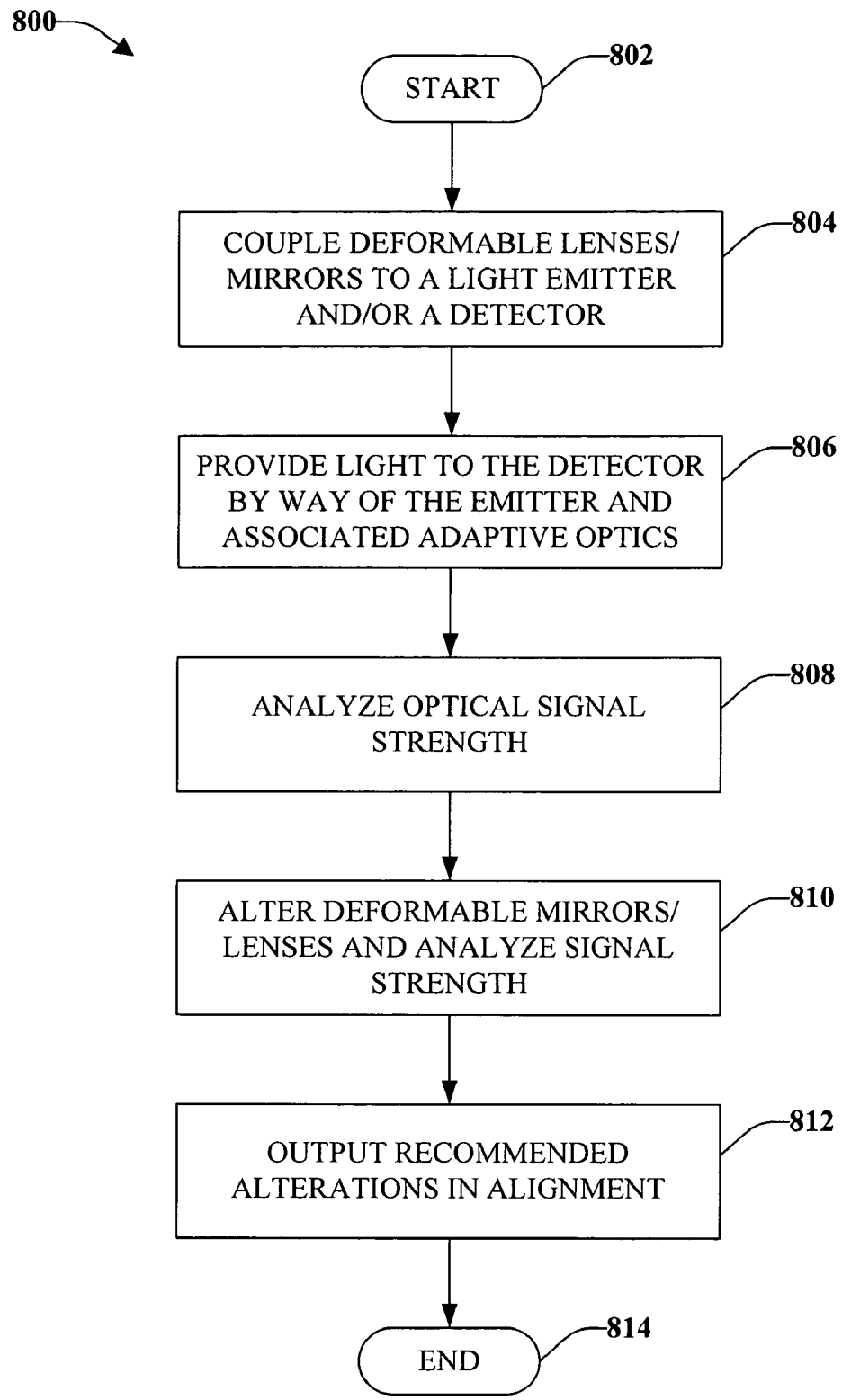
FIG. 8 is a representative flow diagram of a methodology for initially aligning an emitter and a detector in an industrial environment through utilization of adaptive optics.
Figure 9:
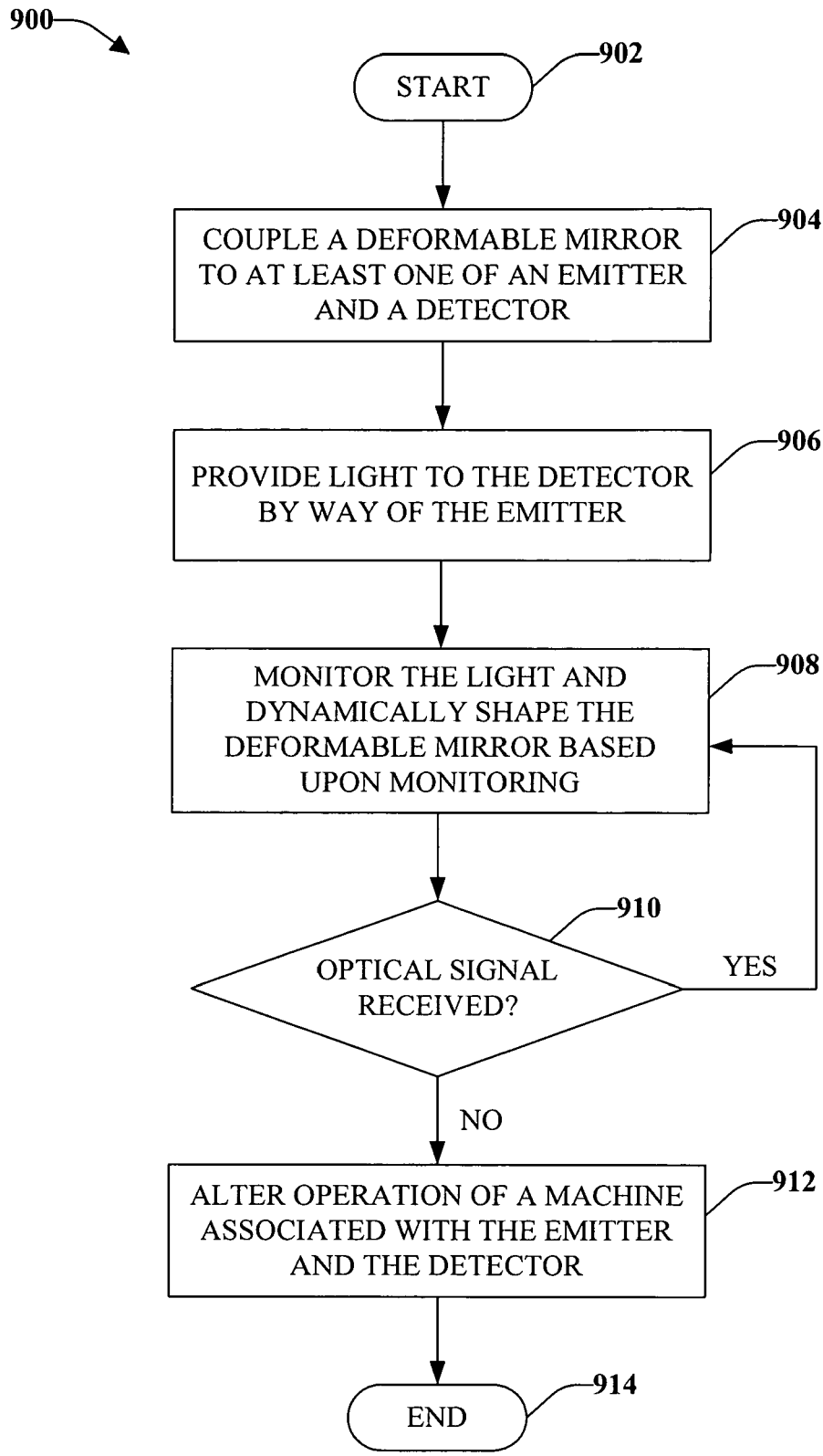
FIG. 9 is a representative flow diagram of a methodology for determining whether an optical signal has been received at a detector.

Referring to FIGS. 7-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 7, a methodology 700 for utilizing adaptive optics in an industrial system is illustrated. The methodology 700 starts at 702, and at 704 a light emitter is provided. For example, the light emitter can be an LED, a solid-state light emitter, or any other suitable light-emitting device. At 706, a deformable mirror/lens is optically coupled proximate to the light emitter, such that shaping the deformable mirror/lens can alter magnitude and/or direction of light emitted by the emitter. Furthermore, while not illustrated in the methodology 700, multiple deformable mirrors/lenses can be optically coupled to the light emitter together with actuators that facilitate shaping of such mirrors. Thus, several actuators can be associated with each deformable mirror/lens, and provision of certain amounts of energy to different actuators can enable shaping of the deformable mirrors/lenses in a desired manner.

At 708, light is emitted from the emitter towards a detector by way of the deformable mirror/lens. For instance, the emitter and the detector can be utilized in a safety system, such that a beam of light is generated at the emitter and travels through space proximate to a machine (or portion thereof and is received at a detector. If the beam of light is obstructed, signal analysis circuitry associated with the detector can determine lack of an optical signal and cause operation of a machine to be altered (e.g., cause the hazardous motion of the machine to be stopped). Due to vibration, however, emitters and detectors can become misaligned, resulting in weakened optical signals received at the detector and possibility of error with respect to a safety system. At 710, the deformable mirror/lens is dynamically shaped to enhance the optical signal at the detector. For instance, signal analysis circuitry can determine that strength of the optical signal has weakened over time as a result of misalignment, and shaping the deformable mirror/lens in a particular manner can enhance such signal. Therefore, an amount of time between realignments of an emitter and a detector is lengthened. Additionally, while the methodology 700 described includes adaptive optics (deformable mirrors/lenses) at the light emitter, it can be discerned that adaptive optics can additionally or alternatively be employed at the detector to enhance strength/quality of an optical signal. The methodology 700 completes at 712.

Now referring to FIG. 8, a methodology 800 for initially aligning a light emitter and a detector within an industrial safety system and/or an optical scanning device is illustrated. The methodology 800 begins at 802, and at 804 deformable mirrors/lenses are coupled to at least one of a light emitter and a detector, wherein the term "coupled" is intended to refer to optical coupling of the deformable mirrors/lenses to the emitter and/or detector while being physically proximate to the emitter and/or detector. At 806, light is provided to the detector by way of the emitter and the adaptive optics associated with the emitter and/or detector. For instance, initially the adaptive optics (e.g., deformable mirrors/lenses) can be positioned in a "neutral" manner so as to not substantially affect light provided by the emitter and received at the detector.

At 808, strength/quality of an optical signal received at the detector is analyzed. For example, if the emitter and the detector are not properly aligned, the strength of the optical signal may be weaker than expected. Moreover, analysis of the optical signal can result in an indication of how the deformable mirrors/lenses should be shaped to enhance the optical signal received at the detector. At 810, the deformable mirrors/lenses are shaped and signal strength resulting from such shaping can be analyzed. The deformable mirrors/lenses can be shaped in a variety of manners, thereby providing multiple signals to analyze given different shapings of the deformable mirrors/lenses. At 812, recommended alterations in alignment between the emitter and the detector can be output to a user by way of a graphical or other type of user interface, can be provided to actuators that can alter position of the emitter and/or the detector, or can be output to any other suitable device. Thus, the methodology 800 aids in initially aligning an emitter and a detector. The methodology 800 completes at 814.

Turning now to FIG. 9, a methodology 900 for utilizing adaptive optics in connection with an industrial safety system is illustrated. The methodology 900 starts at 902, and at 904 a deformable mirror/lens is coupled to at least one of an emitter and a detector. As stated above, multiple deformable mirrors and/or lenses can be optically coupled to the emitter and/or detector, and each deformable mirror/lens can be associated with one or more actuators that effectuate shaping the mirror in a desired manner. At 906, light is provided to the detector by way of the emitter and the adaptive optics (deformable mirrors/lenses). Thus, a beam of light travels through space between the emitter and the detector. At 908, the light is monitored at the detector and the deformable mirror/lens is dynamically shaped based upon the monitoring. More particularly, if the emitter and detector become partially misaligned, such misalignment can be determined by monitoring the light at the detector (e.g., optical signals) and the deformable mirror/lens can be shaped to reduce problems associated with misalignment. The light can also be monitored to determine whether an obstruction exists between the emitter and detector.

At 910, a determination is made regarding whether an optical signal has been received at the detector. For example, if the detector does not receive an optical signal, there are several possibilities: the beam of light has been obstructed, the emitter has failed, the detector has failed, the emitter and detector have become misaligned to the extent that adaptive optics cannot be employed to redirect the beam of light, etc. Regardless, it is most likely desirable to shut down the hazardous motion of a machine associated with the emitter and the detector to ensure that harm does not befall an individual, machine, and/or product. In one specific example, if the emitter and detector have become entirely misaligned, the deformable mirror(s)/lens(es) associated therewith can be shaped to a "neutral" position (e.g., a position that does not substantially alter direction and/or magnitude of light). If an optical signal is received at the detector, the methodology returns to 908. If no optical signal has been detected, at 912 operation of a machine is altered. For instance, the machine may be shut down. The methodology 900 then completes at 914.

Figure 10:
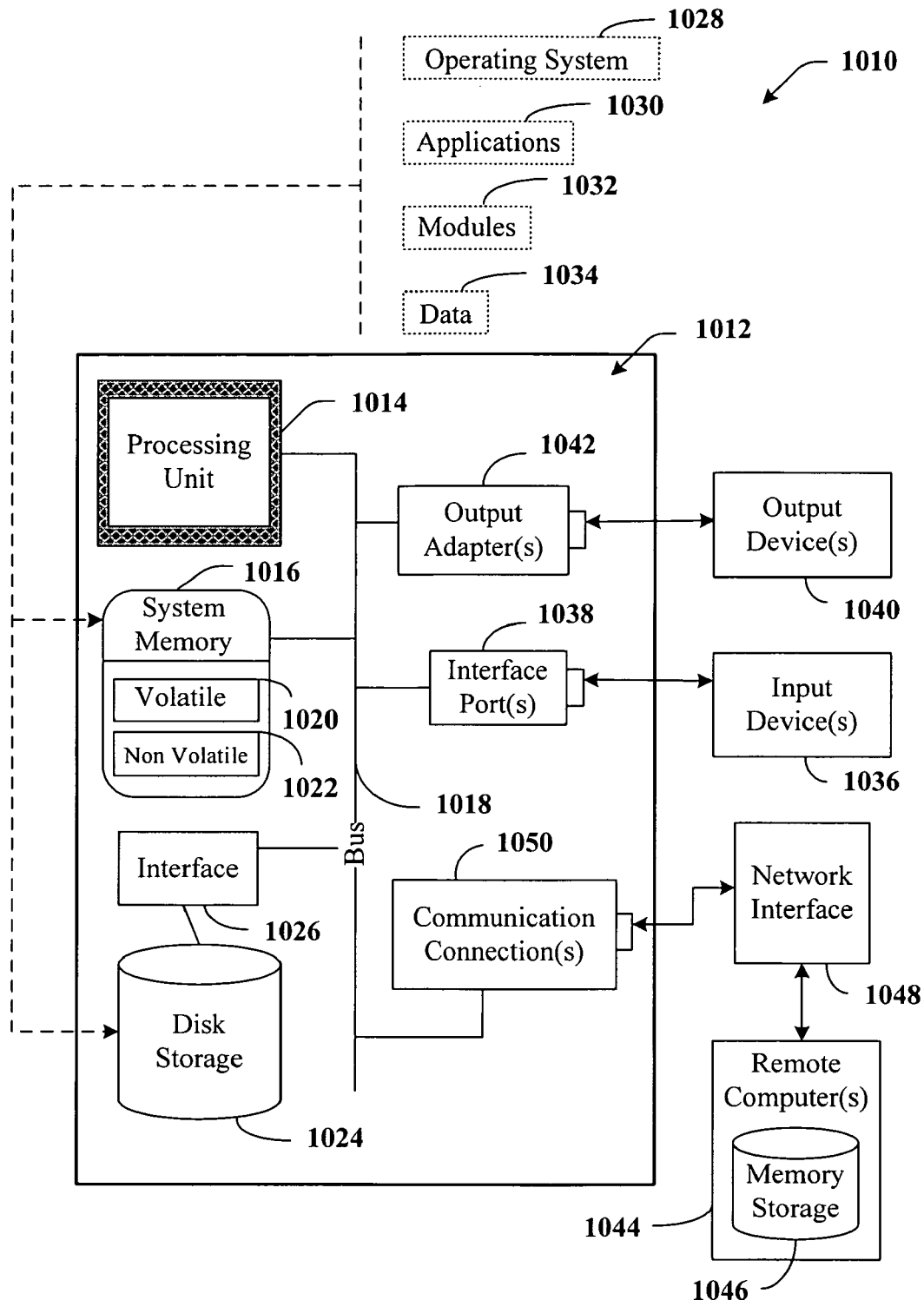
FIG. 10 is an exemplary computing environment that can be utilized in connection with the claimed subject matter.

With reference to FIG. 10, an exemplary environment 1010 for implementing various aspects of the claimed subject matter, including controlling operation of a machine, analyzing optical signals, and dynamically shaping adaptive optics includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial device, comprising:
    a light emitter;
    a detector that is optically aligned with the light emitter;
    a first deformable mirror/lens that is optically coupled to the light emitter, the first deformable mirror/lens is dynamically shaped to correct misalignment between the light emitter and the detector;
    an actuator associated with the first deformable mirror/lens;
    a power component that provides at least one of voltage or current to the actuator to shape the first deformable mirror/lens;
    an analysis component that analyzes the strength of an optical signal received at the detector and provides instructions to the power component to shape the first deformable mirror/lens based at least in part upon the analyzed strength of the optical signal.

2. The device of claim 1, further comprising a second deformable mirror/lens that is optically coupled to the detector, the second deformable mirror/lens is dynamically shaped to direct light to the detector.

3. The device of claim 1, the analysis component converts the optical signal strength to at least one of an amount of misalignment or a percent difference between strength of the optical signal and an optimal optical signal strength.

4. The device of claim 1, the first deformable mirror/lens is associated with a plurality of actuators and the power component provides voltages or currents to at least two actuators of the plurality of actuators to reshape the first deformable mirror/lens.

5. The device of claim 1, further comprising an alarm component that generates an alarm if the strength of the received signal is below a predefined threshold signal strength, wherein the reduced strength of the received signal is due to misalignment so that the first deformable mirror/lens is incapable of further enhancing the optical signal.

6. The device of claim 1, further comprising:
    a data store that retains a subset of measurements generated by the analysis component; and
    an estimation component analyzes the subset of measurements and outputs a time in the future when the light emitter and detector should be realigned.

7. The device of claim 1, further comprising a control component that determines whether an obstruction exists between the light emitter and the detector based upon the optical signal received at the detector and alters operation of a machine associated with the industrial device if it is determined that the obstruction exists.

8. The device of claim 7, the control component is configured to one of shut down the machine or stop a hazardous motion of the machine if it is determined that the obstruction exists.

9. The device of claim 1, further comprising an alarm generator component that generates an alarm if it is determined that an obstruction exists between the light emitter and the detector.

10. The device of claim 1 is a barcode scanner.

11. The device of claim 1 is a single beam safety device.

12. The device of claim 1 is a safety light curtain.

13. The device of claim 1, further comprising an optical signal analysis component that analyzes the optical signal received by the detector and determines information resident within a scanned barcode.

14. The device of claim 1, further comprising an initialization component that receives optical signals from the detector, analyzes the optical signals to determine signal strength received at the detector, dynamically shapes the first deformable mirror/lens to alter the signal strength received at the detector or produces an amount of translation and a direction for optimal alignment of the light emitter and the detector to increase the signal strength received at the detector.

15. The device of claim 14, the initialization component enables the light emitter and detector to locate one another.

16. The device of claim 1, the first deformable mirror/lens is one of a micromachined membrane deformable mirror, a piezoelectric deformable mirror, or a continuous membrane deformable mirror.

17. The device of claim 1, the first deformable mirror/lens is one of a liquid lens, a magnetic fluidic lens, or a liquid crystal lens.

18. The device of claim 1, the first deformable mirror/lens configured to act as a filter with respect to light of particular wavelengths.

19. The device of claim 1, the light emitter is physically coupled to a plurality of deformable mirrors/lenses.

20. An industrial device, comprising:
- a light emitter optically coupled to a first adaptive optic device;
- a detector aligned with the emitter and optically coupled to a second adaptive optic device, wherein
  - the first adaptive optic device comprises a first deformable mirror/lens and a first plurality of actuators and facilitates receipt of light at the detector and
  - the second adaptive optic device comprises a second deformable mirror/lens and a second plurality of actuators and facilitates transmittal of light to the detector;
- an analysis component that analyzes the light signal received at the detector and determines whether the emitter and the detector are misaligned; and
- a power supply that receives an indication that the emitter and detector are misaligned and delivers at least one of voltage or current to at least one of the first plurality of actuators or the second plurality of actuators to change the shape of at least one of the first deformable mirror/lens or the second deformable mirror/lens to optimize the light signal received at the detector.

21. A method for automatically aligning an emitter and a detector, comprising:
- optically coupling a deformable mirror/lens to an emitter;
- providing an optical signal to a detector from the emitter, wherein the deformable mirror/lens is in a neutral position;
- analyzing a strength of the optical signal received at the detector;
- applying a plurality of voltages or currents to at least one actuator associated with the deformable mirror/lens to dynamically shape the deformable mirror/lens in a plurality of configurations;
- analyzing the strength of the optical signal received at the detector for each of the plurality of configurations; and
- recommending a best one of the plurality of configurations or recommending alterations in an alignment of the detector and the emitter by an optical signal analysis component.

22. The method of claim 21, further comprising:
- optically coupling a second deformable mirror/lens to the detector; and
- dynamically shaping the second deformable mirror/lens to enhance the strength of the optical signal received at the detector.

23. The method of claim 21, further comprising:
- monitoring the optical signal at the detector, if the signal strength received at the detector is reduced, dynamically shaping the deformable mirror/lens;
- determining that the optical signal is obstructed based upon the monitoring;
- detecting an object between the emitter and the detector based upon the determination; and
- altering operation of a machine associated with the emitter and the detector based at least in part upon the detection.

24. The method of claim 23, further comprising shutting down hazardous motion of the machine based at least in part upon the detection.

25. The method of claim 23, further comprising generating an alarm upon detecting the object between the emitter and the detector.

26. The method of claim 21, further comprising:
- comparing the signal strength received at the detector with a threshold; and
- generating an alarm if the signal strength received at the detector is below the threshold.

27. An industrial safety system, comprising:
- means for generating a beam of light;
- means for receiving the beam of light;
- means for analyzing the strength of the received beam of light and determining that an adaptive optic element at the means for generating the beam of light is misaligned; and
- means for applying at least one of voltage or current to an actuator associated with the adaptive optic element to dynamically shape the adaptive optic element to enhance the strength of the received beam of light.

* * * * *

UNITED STATES PATENT AND TRADEMARK OFFICE
CERTIFICATE OF CORRECTION

| | |
|---|---|
| PATENT NO. | : 7,652,759 B1 |
| APPLICATION NO. | : 11/360174 |
| DATED | : February 9, 2010 |
| INVENTOR(S) | : James E. Dogul et al. |

It is certified that error appears in the above-identified patent and that said Letters Patent is hereby corrected as shown below:

In column 6, line 34, delete "deform able" and replace with "deformable,".

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO.        : 7,652,759 B1
APPLICATION NO.   : 11/360174
DATED             : January 26, 2010
INVENTOR(S)       : Dogul et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this

Twenty-third Day of November, 2010

David J. Kappos
*Director of the United States Patent and Trademark Office*